W. T. HENDERSON.
MOUNTING.
APPLICATION FILED APR. 30, 1918.
1,329,401.
Patented Feb. 3, 1920.
2 SHEETS—SHEET 1.
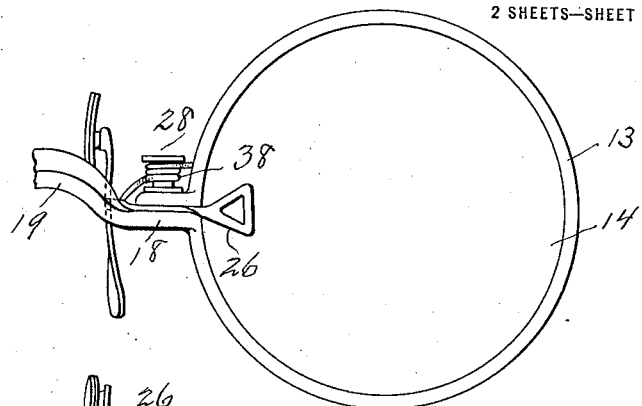
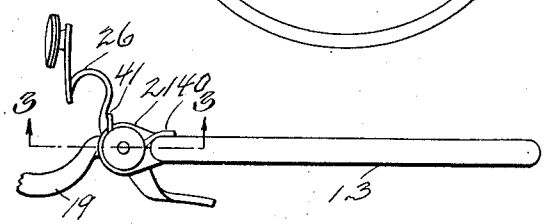
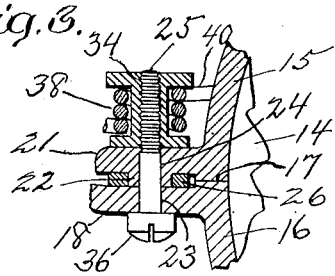
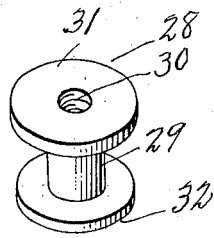
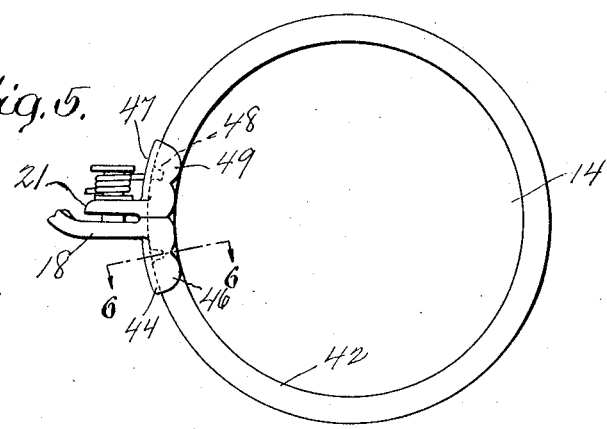
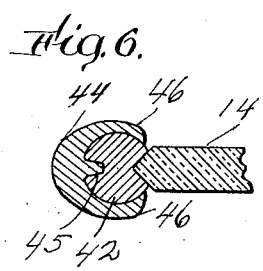
Inventor:
William T. Henderson,
By Horatio E. Bellows,
Atty.

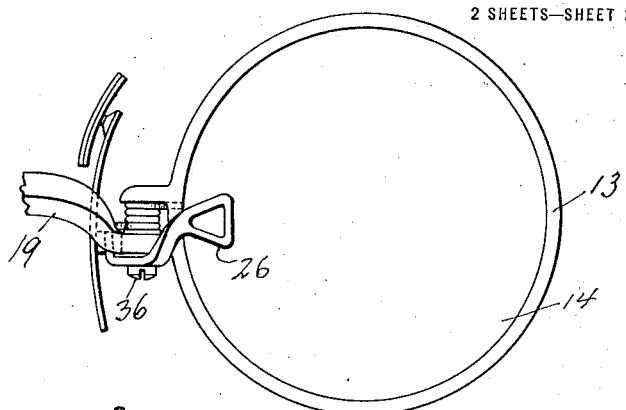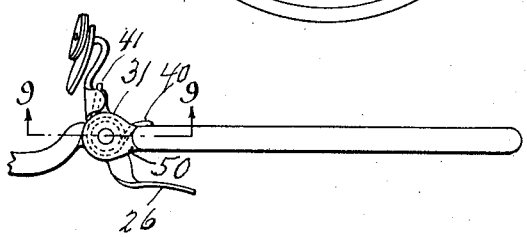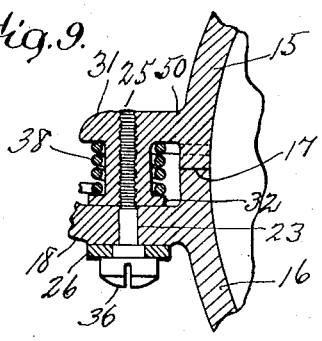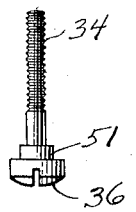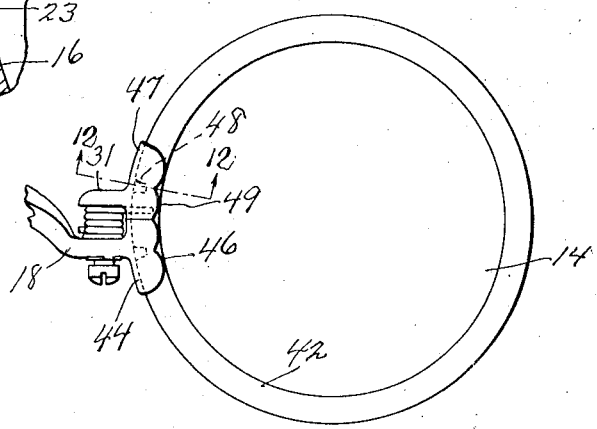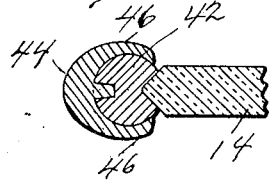

UNITED STATES PATENT OFFICE.

WILLIAM T. HENDERSON, OF OKLAHOMA, OKLAHOMA.

MOUNTING.

1,329,401.  Specification of Letters Patent.  Patented Feb. 3, 1920.

Application filed April 30, 1918. Serial No. 231,580.

*To all whom it may concern:*

Be it known that I, WILLIAM T. HENDERSON, a citizen of the United States, residing at Oklahoma, in the county of Oklahoma and State of Oklahoma, have invented certain new and useful Improvements in Mountings, of which the following is a specification.

My invention relates to mountings for eye glasses and spectacles including particularly ophthalmic mountings of the finger piece type.

An object of my invention is to facilitate the insertion of lenses with-out derangement of the constituent parts of the mountings.

Another object is to independently support the lever springs and maintain the spring bodies at all times out of contact with the pivot post or screw and with the lever; and to axially and radially adjust the springs.

A further object is to lock all the mounting parts by a single member.

And finally it is sought to combine strength and compactness in a mounting wherein skilled labor may be dispensed with.

To the enumerated and other ends my invention consists in such parts and combinations of parts as fall within the scope of the appended claims.

In the accompanying drawings which form a part of this specification,

Figures 1 and 2, are front and plan elevations respectively of a portion of a pair of eyeglasses embodying my invention, Fig. 3, a section of the same on line 3—3 of Fig. 2, Fig. 4, a detail of the spool, Fig. 5, a front elevation of my invention applied to a non-metallic rim, the lever arm being omitted, Fig. 6, a section on line 6—6 of Fig. 5, Figs. 7, 8, and 9, views corresponding respectively to Figs. 1, 2, and 3, of a modified form of my invention, Fig. 10, a detail of the screw, Fig. 11, a front elevation of this modification embodied in a non metallic rim, omitting the operating lever, and Fig. 12, a section on line 12—12 of Fig. 11.

Like reference characters indicate like parts throughout the views.

In its expressed embodiment my mounting comprises a split lens rim or eye wire 13 for each lens 14.

The ends 15 and 16 of each rim, together with the severance or joint 17 thereof, are apparent in Fig. 3. In non sectional view the joint 17 is preferably V shaped.

Integral with the end 16 is the supporting portion 18 of the usual bridge 19. Integral with the end 15, and parallel with the bridge portion 18 is a circular support or lug 21 provided on its bottom with a boss 22 contacting with the upper face of the bridge end 18. Both the portions 18 and disk 21 have central openings 23 and 24 to receive a screw 25.

Loosely mounted on each boss 22 is an operating lever 26.

An independent member is provided for carrying the operating spring. This carrier 28, as shown in Fig. 4, constitutes a spool consisting of a tubular body 29 provided with an internal thread 30. The head 31 upon the top of the body is preferably of much greater diameter than the head 32 upon the bottom of the body. In fact the latter head may be merely an annular projection. This spool rests upon the lug 21 and its thread 30 is engaged by a thread 34 on the screw 25. By turning the head 36 of this screw, which head is adjacent the bridge 18, the spool may be axially adjusted.

The spring mounted on this carrier may be of any desired cross sectional shape. In the instance shown the spring comprises a helical body 38 embracing the spool body 29, and having its end coils retained by the spool heads 31 and 32. The end coils of the spring are extended into arms. The upper arm 40 engages the rim 13; and the lower arm 41 engages the operating lever 26.

It will be noted that all the described parts of the mounting are held in assembled position by the screw 25. By turning this screw the rim ends 15 and 16 may be distended to receive a new lens, yet without dismounting the lever 21 or the spring 38. The mounting of the spring 38 on the spool renders the form portable, axially and radially adjustable, and free from accidental disarrangement. An important advantage of the spool is the assistance in speedily and accurately locating the spring in assembling the parts.

My invention as applied to shell, or composition frames or rims will be understood by reference to Figs. 5 and 6 wherein the lens 14 is embraced by a split rim 42 of celluloid, shell, xylonite, or the like. Herein, because of the character of the rim material, the bridge end 18 carries upon its end a metal clamping plate 44 engaging the rim with its prong 45 and clamps 46. The lug 21 has also a clamping plate 47 with its prong 48 and clamps 49.

In both the described forms of my invention the spring 38 and arms 40, and 41 serve to normally press the pads of the pairs of levers 26 against the wearer's nose.

The modification of my invention shown in Figs. 7 to 10 inclusive differs from that already described in that the specific lug 21 is absent, and the head 31 of the spool 29 is fast at its periphery to the rim end 15, making a lug, web, or connection 50. Another change is the mounting of the lever 26 loosely on a shoulder 51 adjacent the head 36 of the screw 25. The modified form is expressed in non-metallic rims as detailed in Figs. 11 and 12.

I claim:—

1. In an ophthalmic mounting, the combination with the bridge and operating levers, of screws in the bridge passing loosely through the levers, spools provided with threads engaging the screws, and springs embracing the spools and engaging the levers.

2. In an ophthalmic mounting, the combination of a split rim, a bridge upon one end of the rim, a spool fast to the other end of the rim, a screw in the bridge detachably engaging the spool, a lever pivoted on the screw, and a spring on the spool engaging the lever.

3. In an ophthalmic mounting, the combination of a split non metallic rim, clamping plates on the ends of the rim, a bridge on one plate, a spool fast to the other plate, a screw uniting the bridge and spool, a lever pivotally mounted on the screw, a spring on the spool, and arms on the spring engaging the lever and the second mentioned clamping plate.

In testimony whereof I have affixed my signature.

WILLIAM T. HENDERSON.